July 8, 1958   J. N. ANDERSEN   2,842,425
USE OF SLAG FOR AGGLOMERATION OF RUTILE
FOR SHAFT FURNACE CHLORINATION
Filed July 21, 1955
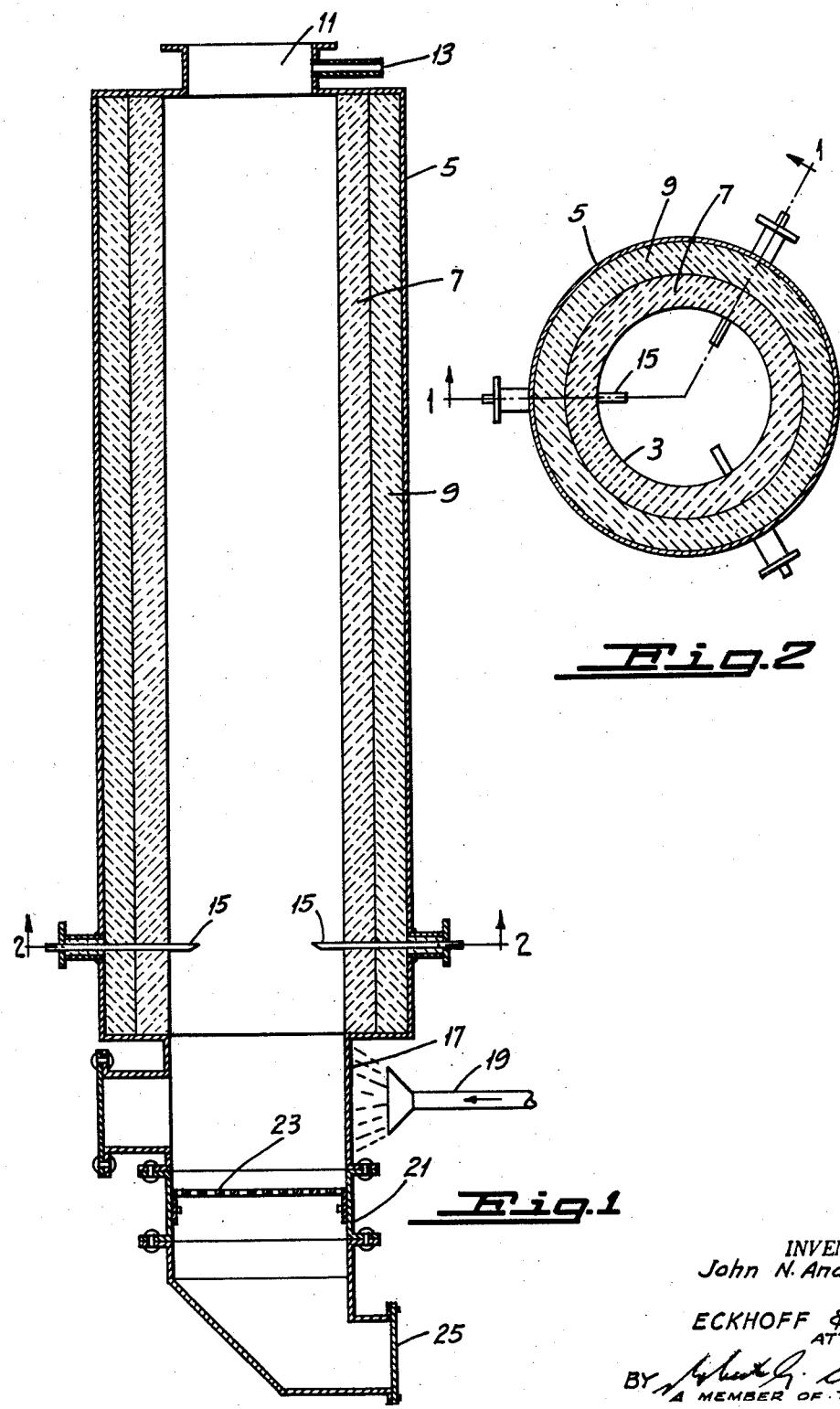
INVENTOR.
John N. Anderson
ECKHOFF & SLICK
ATTORNEYS
BY
A MEMBER OF THE FIRM 2,842,425

USE OF SLAG FOR AGGLOMERATION OF RUTILE FOR SHAFT FURNACE CHLORINATION

John N. Andersen, Grand Island, N. Y., assignor to Stauffer Chemical Company, a corporation of Delaware Application July 21, 1955, Serial No. 523,455

2 Claims. (Cl. 23—87)

The use of rutile as a raw material for the production of titanium tetrachloride is generally preferred by most manufacturers since it is a raw material relatively free of many of the troublesome impurities that are associated with ilmenite, slag and other titaniferous ores. However, as supplied to the industry rutile is ordinarily of a very fine particle size. This physical condition makes it extremely difficult to chlorinate the rutile successfully in a shaft reactor as there is a decided tendency to fluidize and shift or tumble the bed, and thus dilute the hot reaction zone with cold charge which is added periodically to the reactor. Some producers have resorted to briquetting of the rutile in order to overcome this problem. Briquetting, however, is an extremely troublesome technique as well as being expensive. The binder used in briquetting also introduces a contaminant into the titanium tetrachloride product as well as contributing to gumming up or plugging the titanium tetrachloride process lines connected to the reactor.

This invention consists of a method for agglomerating rutile in a shaft reactor without resorting to briquetting. When the rutile in a reactor is agglomerated reasonably high chlorine rates can be tolerated without attaining fluidization. This, of course, results in a higher productivity per square foot of furnace cross section.

I have discovered that the addition of 5 to 20% of an electric furnace slag from the refining of ilmenite, commonly known as Kennecott slag, to the rutile and coke charged to a shaft reactor will result in a sintering or soft bonding of the small charge particles. The sintering is caused by the deposition of other metallic chlorides throughout the charge. Using this technique, I have found it possible to operate the shaft furnace with an ordinary mixture of rutile, carbon, and percentages of Kennecott slag of the order of 10% at reasonably high chlorine rates and good productivity for substantial periods of time. The addition of the slag entirely suppresses any fluidization tendencies and permits uniform and continuous operation of the furnace. A gradual depletion of the charge at the bottom of the furnace permits the cold charge (periodically added through the top of the shaft) to feed gradually down into the reaction zone. Chlorine velocities as high as 120 lbs./hr. per square foot of furnace cross section have been sustained for substantial periods.

It is therefore an object of the present invention to provide a process and apparatus for the chlorination of finely divided rutile with a small amount of slag containing titanium oxide to produce titanium tetrachloride.

Another object of this invention is to provide a process for the utilization of finely divided rutile without operating under fluidizing conditions and without briquetting the rutile.

In the drawing forming a part of this application:

Figure 1 is an elevation view of a reactor in section suitable for carrying out the process of the present invention on the lines 1—1 of Figure 2.

Figure 2 is a plan view of the reactor of Figure 1 on the lines 2—2 of Figure 1.

Referring to the drawings by reference characters, there is shown a reactor having an outer shell 5, and two layers of refractory lining, designated 7 and 9. At the top of the reactor is a charge opening 11, and a vapor take-off line 13. Preferably, the zone defined by the refractory lining 7 is about six times as high as it is wide, although ratios as low as 4-to-1 have been found to work satisfactorily. Located near the bottom of the reaction zone are a plurality of chlorine inlets 15. Preferably, the chlorine inlets are three in number, although a smaller or larger number may be used. Just below the reaction zone defined by the lining 3 is a transition zone 17, which is similar to the reaction zone except that it does not have a refractory lining. Instead, it is cooled by means of a water spray 19, which is played on the outside thereof. Below the transition zone 17 is the grate zone 21, which has a grate 23 therein. At the bottom of the reactor, there is a discharge opening 25 for the removal of ash and other reaction products.

Preferably, the grates 23 are made of a chlorine-resistant metal such as Inconel, which is an alloy containing about 76% nickel, 15% chromium and 7.5% iron. The refractory lining may be of carbon brick, super duty fire clay, or other chlorine resistant refractory.

In operation, the temperature of the grate zone is kept to about 400–500° C. and, in any event, below 500° C. This is attained by water-cooling of the transition zone, as is shown in the drawing, and also by maintaining the hot reaction zone in the furnace, which is achieved by the combination of the high inlet for chlorine, as is shown, and also by adequate cooling and proper ash removal.

The following is a typical example of the manufacture of crude titanium tetrachloride in accordance with the present invention. The slag component of the raw material was known as Kennecott slag having the following composition:

| | Percent |
|---|---|
| Titanium dioxide ($TiO_2$) equivalent | 70.9 |
| Iron oxide (FeO) | 9.2 |
| Metallic iron | 0.6 |
| Silica ($SiO_2$) | 5.9 |
| Alumina ($Al_2O_3$) | 6.6 |
| Calcium oxide (CaO) | 1.1 |
| Magnesium oxide (MgO) | 5.4 |
| | 99.7 |

A coke fire was then built in the reactor above the grate and air was passed through inlets 15 after the fire was well established; a mixture of coke, rutile and slag was then added gradually until a bed height of 6 feet was attained. The mixture contained about one part of coke for four parts rutile, and about 10% slag, based on the rutile. Air was blown through the charge until at least one-third of the charge was above red heat. The air was turned off, the furnace charging port was sealed, and chlorine was introduced into the furnace. The chlorine addition rate was 250 pounds per hour and this rate was maintained for four hours. After four hours, the chlorine was turned off and a quantity of unburned coke and ash was removed from the furnace. The quantity of ash removed was such that active charge just barely reached the level of the chlorine inlets. Normally, ash removal is regulated to maintain a constant bed level while feeding the furnace an amount of slag charge equivalent to the chlorine being reacted. A fresh charge of the rutile, slag, coke mixture was then added to bring the bed level up to 8 feet, the port was sealed, chlorine was turned on and continued for another four hours. During this time, the bed temperature in the reaction zone was maintained at a temperature of 600–1200° C. The crude titanium tetrachloride vapors were continuously withdrawn from the line 13, condensed and treated as is customary in the art. No trouble was encountered due to fluidization. Similar results were obtained when the amount of slag was reduced to 5% or increased to 20%, both percentages being based on the weight of the rutile. Similarly, the ratio of rutile to coke can be varied from about 3 to 1 to about 5 to 1.

Of course, instead of using slag as a sintering agent, one may employ the oxides of calcium and/or magnesium, since these may be introduced as relatively pure compounds and will have the same effect as if they were contained in slag.

I claim:

1. A process for chlorination of rutile in a shaft furnace comprising feeding a finely divided charge of rutile, carbon and a material containing an oxide of at least one metal selected from the group consisting of calcium and magnesium into an upper portion of the shaft furnace for downward passage through a reaction zone in said furnace, said reaction zone being at an elevated temperature whereat titanium tetrachloride is formed and the metal oxide is converted to a liquid metal chloride, and introducing a stream of chlorine into a lower portion of the shaft furnace to pass upwardly through the reaction zone, the quantity of said material fed being sufficient in relation to the charge to provide liquid metal chloride in the reaction zone in an amount sufficient to agglomerate the charge sufficiently to prevent fluidization thereof by the upwardly moving chlorine stream, the rate of chlorine introduction in relation to the charge fed being sufficient in the absence of the aforesaid sufficient agglomeration to fluidize at least a substantial portion of the bed.

2. A process as in claim 1 wherein the charge fed includes from about 3 to 5 parts of rutile to one part of coke and the weight of metal oxide is about 0.5% of the weight of the rutile.

References Cited in the file of this patent

UNITED STATES PATENTS

| | | |
|---|---|---|
| 2,701,179 | McKinney | Feb. 1, 1955 |
| 2,701,180 | Krchma | Feb. 1, 1955 |